United States Patent [19]

Marvin et al.

[11] Patent Number: 4,513,200

[45] Date of Patent: Apr. 23, 1985

[54] FIBER OPTIC MOVEMENT MEASURING SENSOR

[75] Inventors: Dean C. Marvin, Irvine; Neil A. Ives, Yucaipa, both of Calif.

[73] Assignee: Occidental Research Corporation, Los Angeles, Calif.

[21] Appl. No.: 460,421

[22] Filed: Jan. 24, 1983

[51] Int. Cl.³ ............................................. G02B 5/14
[52] U.S. Cl. ................................. 250/227; 250/231 R; 73/784
[58] Field of Search ........................... 250/227, 231 R; 350/96.1, 96.15, 96.16; 455/610, 612; 73/784, 800, 761; 356/32, 34; 340/550, 555

[56] References Cited

U.S. PATENT DOCUMENTS

| | | | |
|---|---|---|---|
| 4,071,753 | 1/1978 | Fulenwider et al. | 250/227 |
| 4,163,397 | 8/1979 | Harmer | 73/800 |
| 4,294,513 | 10/1981 | Nelson et al. | 455/612 |
| 4,436,995 | 3/1984 | Whitten | 350/96.15 |

Primary Examiner—David C. Nelms
Attorney, Agent, or Firm—Walter A. Hackler

[57] ABSTRACT

A sensor and system for measuring movement between two points includes a plurality of members having bearing surfaces thereon with links pivotally connecting the members in a manner which causes the plurality of members to move into alignment along the direction of movement to be measured as such movement occurs. Two end members of the plurality of members are connected to the points between which movement is to be measured and an optic fiber is woven between the plurality of members causing the members in contact therewith from being aligned in the direction of movement to be measured before such movement occurs. Movement between the two points causes alignment of the members and bending of the optic fiber over the bearing surfaces thereon. Spacing of the members and configuration of the bearing surfaces thereon enable the sensor to measure movement over distances up to one inch or more.

20 Claims, 4 Drawing Figures

FIBER OPTIC MOVEMENT MEASURING SENSOR

BACKGROUND OF THE INVENTION

The present invention is directed to a sensor and system for measuring movement between two points. More particularly, the sensor and system are useful for measuring movement between two points over a large range, and more specifically has use for the movement of roofs and floors in subterranean excavations such as in coal mines.

The collapse of a roof in a coal mine (roof fall) is a costly event in terms of mine safety, mine productivity and the financial impact on mining operations.

Continued mining operations after a roof fall require manual cleanup of the rock and debris. This labor intensive process can last for several days, during which time mining operations must be suspended.

A typical mine usually has a great number of potential roof fall areas, and it has been found that unstable roofs are characterized by: (1) a total convergence between the roof and the floor of the mine greater than one inch following mining operations; (2) convergent velocities between the roof and floor of the mine greater than 0.1 inch per day; or (3) any accelerating convergence between the roof and the floor. At the present time, the hereinabove listed criteria are used to determine whether preventative measures, such as roof bolting or cribbing, be installed to prevent subsequent roof fall.

At the present time, roof motion is measured using a dial gauge indicator between reference points anchored in the floor and the roof.

In a typical longwall mining operation, a longwall face could contain as many as 100 of these reference points, sometimes called "convergence stations" or "sag stations".

Positive convergence can be defined as the decrease in the distance between a reference point in the floor of a mine and a reference point attached to the roof. Such positive convergence can arise from either the roof sagging or the floor rising.

In order to measure "sag", a reference point is anchored approximately 8 to 15 feet above the mine roof in stable rock which is presumed not to move. The roof sag is then determined by subtraction of the floor motion relative to this point from the floor motion relative to the anchor.

It should be appreciated that a large number of stations required to monitor an entire mine requires the full-time effort of a number of mine personnel.

Automation of mine convergence is made difficult, and to date no present system is available, because of the stringent environmental constraints on a system designed for use in the mine. For example, in a longwall mining operation approximately half of the convergence stations will be in the return air shaft from the longwall. In these particular locations, substantial amounts of methane gas and coal dust are present. The Mine Safety Health Administration (MSHA) requires that all equipment located in such shafts be certified as "intrinsically safe". This requirement effectively bars any electrical sensing equipment from these locations.

In addition, the presence of high humidity, high dust levels, and mine activity including the movement of heavy machinery, dictates that any sensor or system for measuring and monitoring convergence be very durable. The sensors and system of the present invention are "intrinsically safe" and durable, thereby enabling the continuous monitoring of convergence in a great number of locations in an underground coal mining operation with a significant reduction in the manpower necessary to operate.

SUMMARY OF THE INVENTION

The present invention is directed to a sensor for use in measuring movement between two points and a system utilizing this sensor for measuring and monitoring movement between a plurality of pairs at separated points. The sensor generally comprises a plurality of members having bearing surfaces thereon, with two of the members having means attached thereto for connecting the two members to external points between which movement is desired to be measured. Other members of the plurality of members are separated from, and not directly connected to, the external points. An optic fiber is disposed between at least two of the plurality of members and contacting the bearing surfaces thereon. Means, connecting the plurality of members, are provided for moving the other members contacting the optic fiber and causing the optic fiber to bend as a function of movement between the two external points.

More particularly, link means pivotally connect the plurality of members in a manner causing the plurality of members to move into alignment along the direction of the movement to be measured as such movement occurs. The optic fiber is disposed between a number of the plurality of members to cause non-alignment of the number of members by weaving the optic fiber therebetween so that the optic fiber crosses the direction of movement to be measured as it passes from member to member. Approximately one inch of movement between the two external points is required to cause complete alignment of the plurality of members.

The system for measuring movement between a plurality of pairs of separated points comprises a plurality of sensors, with each sensor being disposed between two associated points and interconnected by a continuous optic fiber, means for introducing laser light into the optic fiber, and means for measuring the amount of laser light lost as a result of such laser light encountering the bend in the optic fiber corresponding to movement between each of the two associated points.

It is apparent that the present invention provides a system by which monitoring of the convergence between two points in an underground coal mine can be conducted with a single optic fiber being a part of and connecting all the sensors. Further, since there is no electrical apparatus situated at the convergence stations at which the movement between two points is desired to be measured, there is no possibility of electrical spark which may cause an explosion of the methane gas in the environment.

BRIEF DESCRIPTION OF THE DRAWINGS

The advantages and features of the present invention will be better understood by the following description and drawings in which.

DETAILED DESCRIPTION

Figure 1:
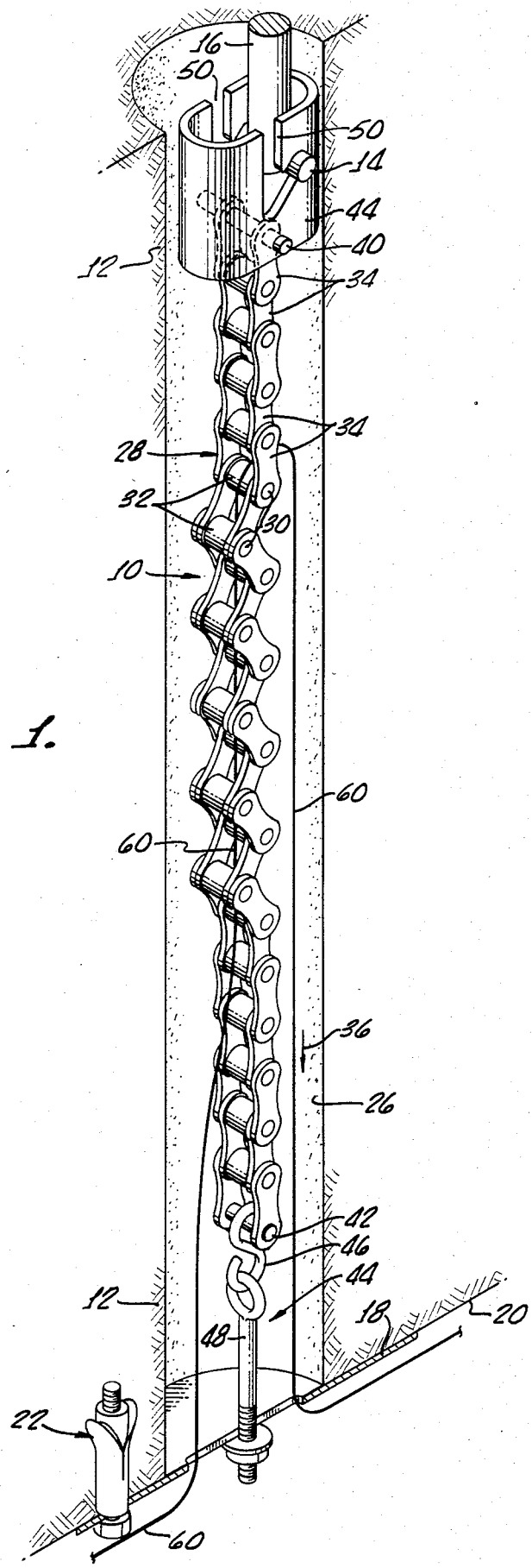
FIG. 1 is a perspective view of a sensor in accordance with the present invention as installed in the roof of a subterranean mine.

Turning now to FIG. 1, there is shown a sensor 10 in accordance with the present invention as it may be employed in a subterranean formation 12 for measuring movement between two points, which may be, for example, a "T" connector end 14 of a roof bolt 16, and a slotted aluminum plate 18 mounted to a mine roof 20 by means of threaded masonry bolts 22.

Briefly, the sensor 10 may be installed by drilling an approximate 1¾ inch diameter hole 26 into the roof 20 of a coal mine to a depth of approximately 10 feet, and thereafter installing a conventional 8-foot roof bolt 16 into stable rock above the mine roof 20.

The sensor 10 may be formed from the conventional ½-inch pitch roller chain, such as a bicycle chain, 28, having a plurality of members, or pins, 30, having cylindrical bearing surfaces 32 thereon. Links 34 provide means for pivotally connecting the pins 30 in a manner causing the pins to move into alignment along the direction of movement to be measured as shown by the arrow 36, as such movement occurs.

Attached to two end members 40, 42 are connectors 44, respectively, for providing means for connecting the two end members 40, 42 to the roof bolt 16 and the slotted aluminum plate 18, respectively. The member 40 may extend beyond the links 34 to engage the connector 42 having a slot 50 therein for engagement of the roof bolt 16 by the "T" connector end 12. The connector 44 may include an "S" hook 46 and an eye bolt 48, the latter providing a means for periodically compensating for the movement between the roof bolt 16 and the slotted aluminum plate 18 to enable an optic fiber 60 to cause the members 30 in contact therewith from being aligned in the direction of movement to be measured, as will be hereinafter discussed. The optic fiber utilized in the sensor of the present invention may be a type QSF 400 available from Quartz Products Corporation of Plainfield, NJ, having a core diameter of approximately 400 microns.

The optic fiber is disposed between a number of the pins to cause non-alignment of the pins by weaving the optic fiber 60 therebetween so that the optic fiber 60 crosses the direction of movement to be measured as it passes from one pin to another pin. For the ½-inch pitch roller chain, it has been found that by weaving the optic fiber through a sufficient number, for example 10, of the pins, the range of movement between the roof bolt 16 and the slotted aluminum plate 18 may be up to one inch before the eye bolt 48 needs to be adjusted to enable the optic fiber 60 to misalign the pins 30, or reset the sensor for another one-inch measuring range.

Figure 2:
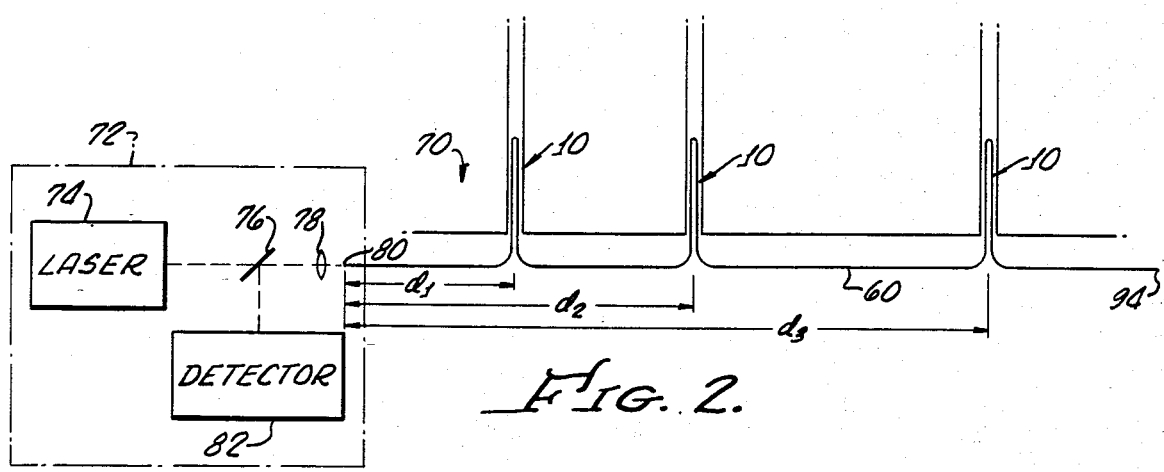
FIG. 2 is a diagram of the system of the present invention showing three sensors installed in the roof of a subterranean mine, along with a diagram of a time domain reflectometer.

Turning now to FIG. 2, there is shown a system 70 in accordance with the present invention for measuring movement between the plurality of pairs of separated points comprising a plurality of the sensors 10 interconnected by the continuous optic fiber 60, and an optical time domain reflectometer 72 which generally includes a pulsed laser 74, beamsplitter 76, lens 78 and detector 82. The optical time domain reflectometer 72, as well as all of the components thereof, are well known in the art.

It should be appreciated that although only three sensors 10 are shown interconnected by the optic fiber 60, a great number of sensors may be employed in the fashion as described in FIG. 2, and further that the sensors may be spaced apart by hundreds of feet, the only limitation being the length of the optic fiber 60.

In operation, a short pulse of laser light emitted from the pulsed laser 74 is focused onto a fiber end 80 by the lens 78 and thereafter propagates down the fiber 60, passing through each of the sensors 10. As is well known, Rayleigh scattering which arises from fluctuations in the fiber medium causes light to escape from the fiber core. The light intensity, as a function of time, is described by the function:

$$I(t) = I_o e^{-at}$$

where $a$ is a constant, $I_o$ is the initial light intensity at the end of the fiber, and $I(t)$ is the light intensity at any time along the fiber and also corresponds, of course, to the distance the light travels along the fiber during that time.

A small amount of light is scattered due to the bending of the fibers, such as the bending occurring in the fiber 60 about the bearing surfaces 32 as the pins 30 are aligned by movement between the roof bolts 16 and the slotted aluminum plate 18 (see FIG. 1).

A small portion of this light is guided back toward the front end 80 of the optic fiber 60 and into the beamsplitter 76, whereupon it is deflected into the detector 82. A plot of the light intensity reaching the detector by this mechanism is represented in FIG. 3.

Figure 3:
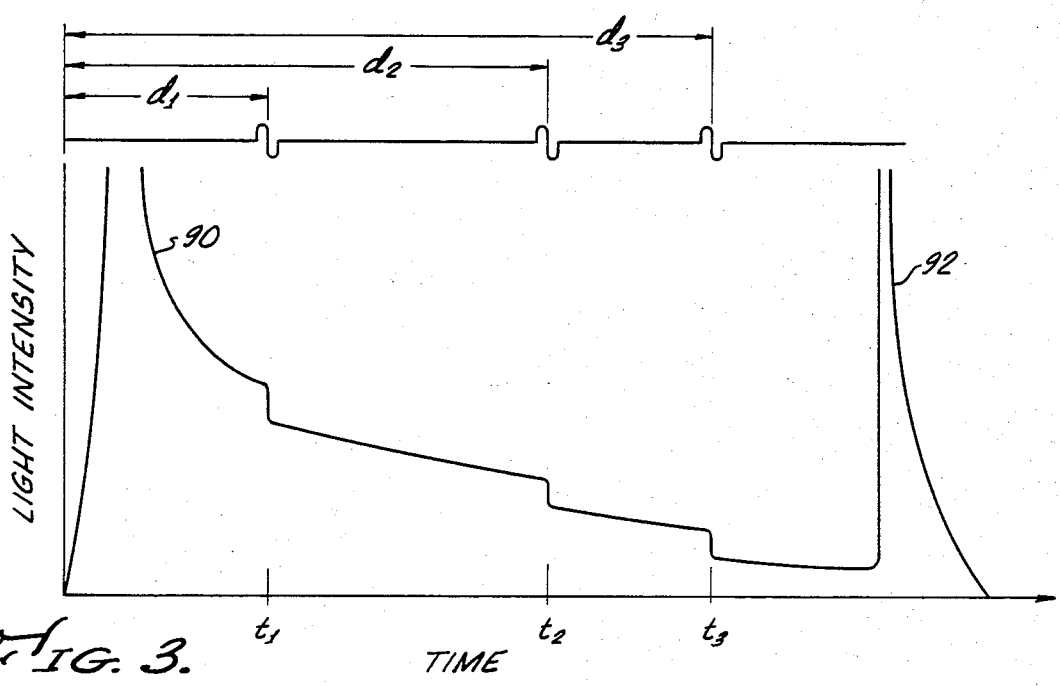
FIG. 3 is a plot of light intensity as a function of time and distance for the laser light introduced into the optic fiber interconnecting the three sensors shown in FIG. 2.

FIG. 3 shows the intensity of the light reaching the detector as a function of time. An initial large peak of light intensity 90 is caused by stray light arising from scattering in the beamsplitter and from reflection at the lens 78 and fiber entrance face that finds its way into the detector 82, and the large peak 92 at the end of the intensity plot shown in FIG. 3 is the reflection of the laser pulse from an opposite end 94 (FIG. 2) of the optic fiber 60.

Sudden decreases shown at $t_1$, $t_2$ and $t_3$ in the light intensity plot of FIG. 3 indicate losses occurring in the sensors 10. It is obvious that these correspond to the distances $d_1$, $d_2$ and $d_3$ of the sensor from the end 80 of the optic fiber 60.

Well known techniques associated with the measurement and the analysis useful with the present invention may be used, as well as commercially available optical time domain reflectometer equipment.

A significant advantage of the present sensor utilizing a 400 micron fiber and 0.5 inch chain, is the range over which it may accurately measure displacements of as small as 0.01 inch, said range being on the order of one inch or more. In addition, the response of the sensor to movement is approximately linear over the entire range. This is to be distinguished from fiber optic sensors which cause a sinusoidal bending, or perturbation, of the fiber optic ("microbend" sensors) such as shown in FIG. 4.

Figure 4:
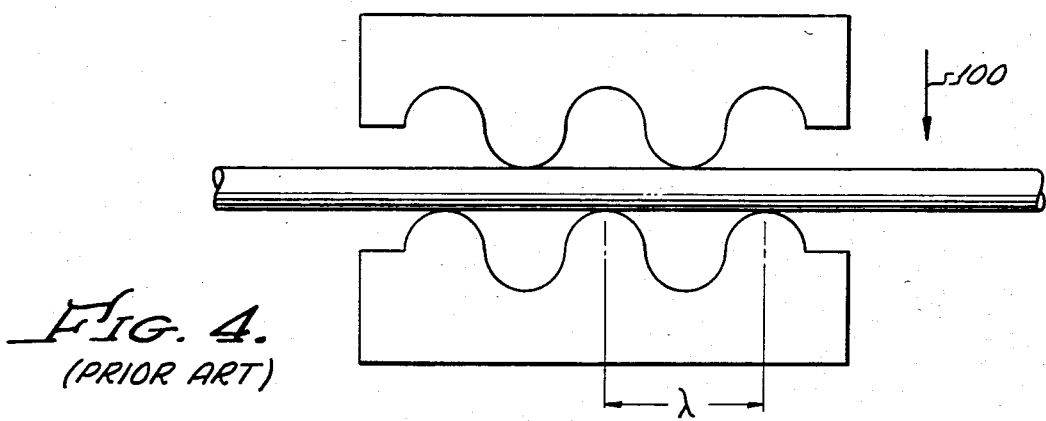
FIG. 4 is a diagram of a prior art microsensor.

As shown in FIG. 4, a displacement along the direction of the arrow 100 having the magnitude "A" forms a sinusoidal perturbation of the form, $A \sin(\lambda)X$, on the fiber. It has been shown (Unger, *Planar Optical Wave Guides and Fibers*, Clarendon Press, Oxford, 1977) that the light loss on the fiber as a result of such microbending depends on the power spectrum of the perturbing function, which is proportional to $A^2$. This response is non-linear and the range of motion along the direction of the arrow 100 is limited.

The sensor 10 in accordance with the present invention has an output which is not dependent upon the square of the displacement, or movement to be measured, but varies in a generally uniform, or linear, manner.

Although there has been described hereinabove a specific sensor and system for measuring movement between two points in accordance with the present invention for the purpose of illustrating the manner in which the invention may be used to advantage, it should be appreciated that the invention is not limited thereto. Accordingly, any and all modifications, variations or equivalent arrangements which may occur to those skilled in the art should be considered to be within the scope of the invention as defined in the appended claims. What is claimed is:

1. A sensor for use in measuring movement between two points comprising:
   a plurality of members having bearing surfaces thereon, two of said members having means attached thereto for connecting said two members to external points between which movement is desired to be measured, other members of said plurality of members being separated from, and not directly connected to, said external points;
   an optic fiber disposed between at least two of said plurality of members and contacting the bearing surfaces thereon; and
   means, connecting said plurality of members, for moving said other members contacting the optic fiber and causing the optic fiber to bend as a function of movement between the two external points.

2. A sensor for use in measuring movement between two points comprising:
   a plurality of members having contoured bearing surfaces thereon, two of said members having connecting means attached thereto for connecting said two members to external points between which movement is desired to be measured, other members of said plurality of members being separated from, and not directly connected to, said external points;
   an optic fiber disposed between at least two of said plurality of members and contacting the bearing surfaces thereon; and
   means, connecting said plurality of members, for moving said other members contacting the optic fiber and causing the optic fiber to bend over the contoured bearing surfaces of the contacting member as a function of movement between the two external points.

3. The sensor of claim 2 wherein the plurality of members comprises a set of pins and said means connecting said plurality of members comprises a set of links.

4. The sensor of claim 3 wherein the plurality of members are serially connected and held in a spaced-apart relationship by said means connecting said plurality of members.

5. The sensor of claim 4 wherein the pins are cylindrical in shape and have a constant radius defining the contour of the bearing surface thereon.

6. The sensor of claim 5 wherein the spacing between the pins is determined for causing the optic fiber to bend only over the contoured bearing surfaces, the total amount of bent optic fiber being a function of movement between the two external points.

7. The sensor of claim 6 wherein the members are spaced a sufficient distance apart so that a straight portion of optic fiber exists between each portion of the optic fiber bent over the contoured bearing surfaces.

8. A sensor for use in measuring movement between two points comprising:
   a plurality of members having bearing surfaces thereon;
   link means pivotally connecting said plurality of members in a manner causing the plurality of members to move into alignment along the direction of the movement to be measured as such movement occurs;
   connecting means, attached to two end members of said plurality of members, for connecting said two end members to external points between which movement is to be measured; and
   an optic fiber, disposed between at least two of said plurality of members and contacting the bearing surfaces thereon, said optic fiber causing the members in contact therewith from being aligned in the direction of movement to be measured before such movement occurs, said optic fiber being bent over the bearing surfaces as the link means cause the plurality of members to move into alignment as movement to be measured occurs.

9. The sensor of claim 8 wherein said connecting means includes means for periodically compensating for the movement between the external points to enable the optic fiber to cause the members in contact therewith from being aligned in the direction of movement to be measured.

10. The sensor of claim 9 wherein the means for compensating for the movement between the external points is configured for compensating up to approximately 5 inches of such movement.

11. The sensor of claim 10 wherein the optic fiber is disposed between ten of said plurality of members by weaving the optic fiber therebetween so that the optic fiber crosses the direction of movement to be measured as it passes from member to member.

12. The sensor of claim 11 wherein the optic fiber is disposed between a sufficient number of said plurality of members to cause non-alignment of said sufficient number of members to require approximately one inch of movement between the two external points to cause complete alignment of the plurality of members.

13. The sensor of claim 12 wherein the members are spaced a sufficient distance apart so that a straight portion of optic fiber exists between each portion of the optic fiber bent over the bearing surfaces.

14. The sensor of claim 13 wherein the plurality of members and the link means comprise 0.5 inch pitch roller chain.

15. The sensor of claim 14 wherein the optic fiber has a diameter of 400 micrometers.

16. A sensor for use in measuring movement between two points comprising:
   a plurality of members having bearing surfaces thereon;
   link means pivotally connecting said plurality of members in a manner causing the plurality of members to move into alignment along the direction of the movement to be measured as such movement occurs;
   an optic fiber, disposed between a sufficient number of said plurality of members to cause non-alignment of said sufficient number of members to require approximately one inch of movement between the two external points to cause complete alignment of the plurality of members, said optic fiber being disposed between said plurality of members by weaving the optic fiber therebetween so that the optic fiber crosses the direction of movement to be measured as it passes from member to member, said optic fiber being bent over the contacting surfaces as the link means cause the plurality of members to move into alignment as movement to be measured occurs; and connecting means, attached to two end members of said plurality of members, for connecting said two end members to external points between which movement is to be measured, said connecting means including means for periodically compensating for the movement between the external points to enable the optic fiber to cause the members in contact therewith from being aligned in the direction of movement to be measured.

17. A system for measuring movement between two points comprising:
(a) a sensor comprising:
a plurality of members having bearing surfaces thereon, two of said members having means attached thereto for connecting said two members to external points between which movement is desired to be measured, other members of said plurality of members being separated from, and not directly connected to, said external points,
an optic fiber disposed between at least two of said plurality of members and contacting the bearing surfaces thereon, and
means, connecting said plurality of members, for moving said other members contacting the optic fiber and causing the optic fiber to bend as a function of movement between the two external points;
(b) means for introducing laser light into the optic fiber; and
(c) means for measuring the amount of laser light lost as a result of such laser light encountering the bend in the optic fiber corresponding to movement between the two external points.

18. A system for measuring movement between two points comprising:
(a) a sensor comprising:
a plurality of members having bearing surfaces thereon,
link means pivotally connecting said plurality of members in a manner causing the plurality of members to move into alignment along the direction of the movement to be measured as such movement occurs,
connecting means, attached to two end members of said plurality of members, for connecting said two end members to external points between which movement is to be measured, and
an optic fiber, disposed between at least two of said plurality of members and contacting the bearing surfaces thereon, said optic fiber causing the members in contact therewith from being aligned in the direction of movement to be measured before such movement occurs, said optic fiber being bent over the contacting surfaces as the link means cause the plurality of members to move into alignment as movement to be measured occurs;
(b) means for introducing laser light into the optic fiber; and
(c) means for measuring the amount of laser light lost as a result of such laser light encountering the bend in the optic fiber corresponding to movement between the two external points.

19. A system for measuring movement between a plurality of pairs of separated points comprising:
(a) a plurality of sensors, each sensor being disposed between two associated points and interconnected by a continuous optic fiber, each sensor comprising:
a plurality of members having bearing surfaces thereon, two of said members having means attached thereto for connecting said two members to said two associated points, other members of said plurality of members being separated from, and not directly connected to, said two associated points, said optic fiber being disposed between at least two of said plurality of members and contacting the bearing surfaces thereon, and
means, connecting said plurality of members, for moving said other members contacting the optic fiber and causing the optic fiber to bend as a function of movement between the two separated points;
(b) means for introducing laser light into the optic fiber; and
(c) means for measuring the amount of laser light lost as a result of such laser light encountering the bend in the optic fiber corresponding to movement between each of the two associated points.

20. A system for measuring movement between a plurality of pairs of separated points comprising:
(a) a plurality of sensors, each sensor being disposed between two associated points and interconnected by a continuous optic fiber, each sensor comprising:
a plurality of members having bearing surfaces thereon,
link means pivotally connecting said plurality of members in a manner causing the plurality of members to move into alignment along the direction of the movement to be measured as such movement occurs, and
connecting means, attached to two end members of said plurality of members, for connecting said two end members to said two associated points between which movement is to be measured, said optic fiber being disposed between at least two of said plurality of members and contacting the bearing surfaces thereon, said optic fiber causing the members in contact therewith from being aligned in the direction of movement to be measured before such movement occurs, said optic fiber being bent over the contacting surfaces as the link means cause the plurality of members to move into alignment as movement to be measured occurs;
(b) means for introducing laser light into the optic fiber; and
(c) means for measuring the amount of laser light lost as a result of such laser light encountering the bend in the optic fiber corresponding to movement between each of the two associated points.

* * * * *